(No Model.)

F. J. WEIS.
DRIVING MECHANISM FOR CARS.

No. 398,209. Patented Feb. 19, 1889.

Witnesses:
J. Staib
Chas. H. Smith

Inventor:
Francis J. Weis
per Lemuel W. Serrell
Atty

N. PETERS. Photo-Lithographer, Washington, D. C.

UNITED STATES PATENT OFFICE.

FRANCIS J. WEIS, OF JERSEY CITY, NEW JERSEY, ASSIGNOR TO THE UNITED STATES MACHINE COMPANY, OF SAME PLACE.

DRIVING MECHANISM FOR CARS.

SPECIFICATION forming part of Letters Patent No. 398,209, dated February 19, 1889.

Application filed June 28, 1888. Serial No. 278,440. (No model.)

*To all whom it may concern:*

Be it known that I, FRANCIS J. WEIS, of Jersey City, in the county of Hudson and State of New Jersey, have invented an Improvement in Driving Mechanism for Cars; and the following is declared to be a description of the same.

My present invention relates to improvements in car-motors dependent on electricity as a motive power, and said improvements are connected with and relate to the devices described and claimed in the application of Joseph Weis filed July 19, 1887, Serial No. 244,707, which application was duly allowed February 3, 1888.

The devices constituting my present invention are applicable to cars driven by an electric motor, the electric current for operating the motor being derived from any well-known or desired source of supply; and my invention consists in the combination, with the main supporting-frame for the car-body and driving and supporting wheels, of friction-wheels bearing upon annular flanges and operated by a hand-lever system to engage or disengage said friction wheels or flanges to drive or stop the car.

The peculiar and essential feature of my present invention consists in constructing the friction-wheels with a ribbed or a V-grooved surface, and also constructing the inner periphery of the flanges of the driving-wheels or their outer periphery with grooves corresponding in shape to the construction of the friction-wheels, the advantage of this being that a greater surface is presented between the respective friction-wheels and the flanges upon which they operate than would otherwise be presented between two parallel smooth surfaces.

Figure 1:
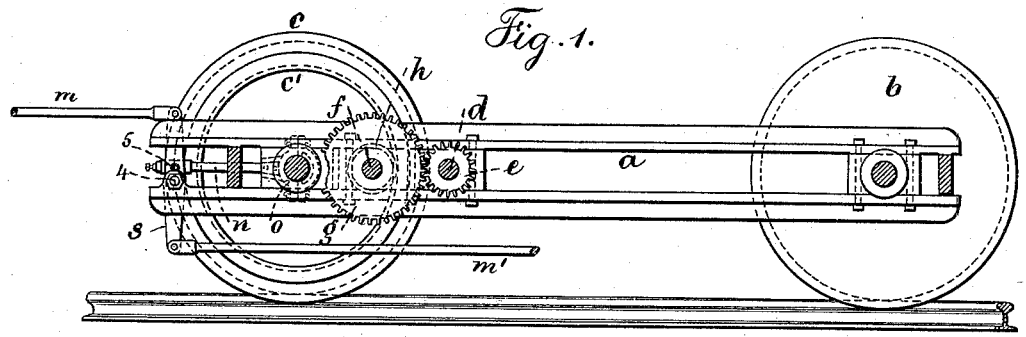
Figure 4:
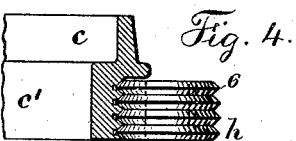
Figure 2:
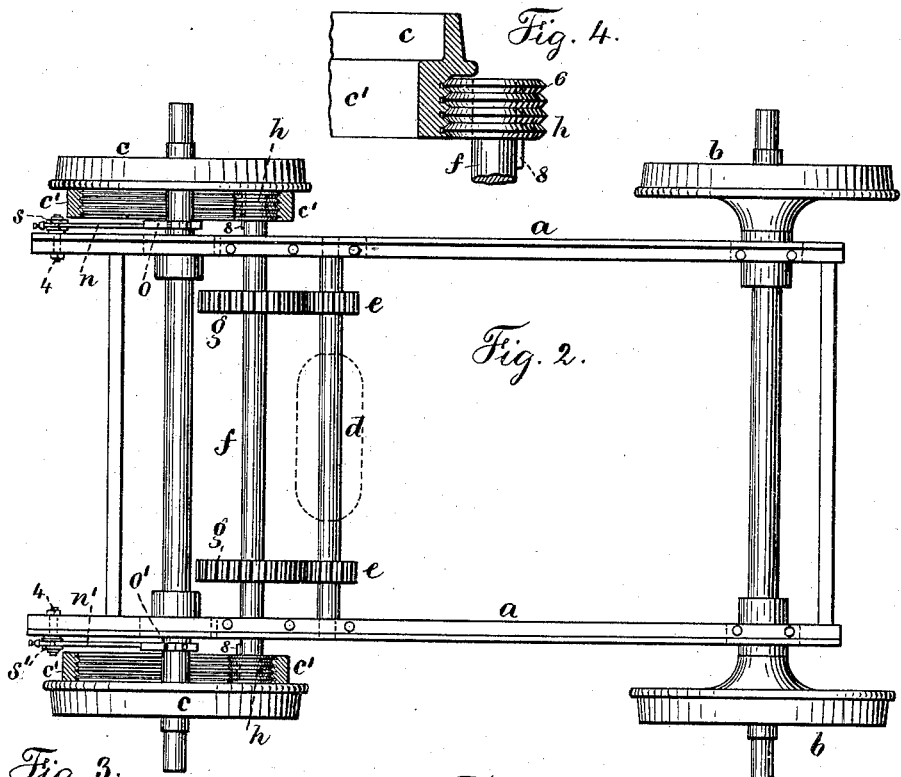
Figure 3:
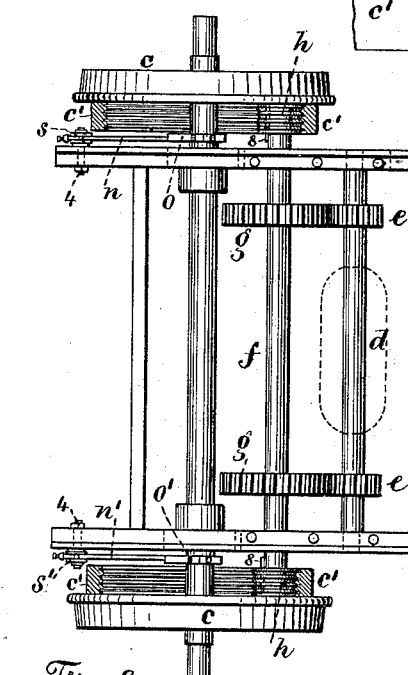
Figure 5:
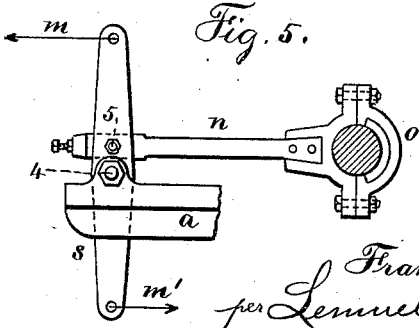

In the drawings, Figure 1 is a sectional elevation of the wheels and gear through the shafts of the respective parts. Fig. 2 is a plan of the same, the flanges of the wheels being in section. Fig. 3 is a view in larger size sectionally of the wheel and flange, with the friction-wheel in elevation. Fig. 4 is a similar view to Fig. 3, the friction-wheels being shown engaging the outer surface of the flange; and Fig. 5 is an elevation of a part of the operating mechanism for moving the driving-wheels.

$a$ represents the frame; $b$, the pair of wheels having bearings at one end of said frame; $c$, the pair of wheels having bearings at the other end of said frame, and having flanges $c'$ upon their inner surfaces, the diameter of which flanges is less than the treads of the respective wheels.

$d$ represents the electrically-rotated or motor shaft, having bearings at its ends in the frame $a$, and having small gears $e$; and $f$ is a shaft, also having bearings in the frame $a$, and having gears $g$, of larger size, meshing with the gears $e$, by which the speed of the electrically-driven shaft $d$ is slowed down.

The armature of the motor is shown by dotted lines around the shaft $d$, and upon the respective ends of the shaft $f$ are the friction-wheels $h$.

The bearings of the driving-wheels $c$ are movable in the frame $a$, and around said shaft or axle, outside of the frame $a$, there are yokes $o$ $o'$, to which are connected the pull-levers $n$ $n'$, and there are rocking frames $s$ $s'$, pivoted at 4 upon the respective ends of the frame $a$, the levers $n$ $n'$ being pivoted at 5 to said rocking frames, and connected to the opposite ends of the rocking frames $s$ $s'$ there are rods $m$ $m'$, passing to the respective ends of the body of the car, which rods are adapted to be moved by a hand-lever of any desired construction, so as to swing the rocking frames $s$ $s'$ out of a vertical line and pull upon the levers $n$ $n'$ to move the shaft of the wheels $c$ and cause their flanges $c'$ to engage with the friction-wheels $h$.

The peculiarity in the construction of the flanges $c'$ and friction-wheels $h$ consists in grooving the inner or outer surface of the flanges $c'$ and the outer surface of the friction-wheels $h$, said grooves being preferably of a V form, the base of the V-grooves in the flanges $c'$ being channeled to a depth beyond the point of the V. This permits the inclined engaging-surface of the friction-wheels $h$ to freely engage the surface of the V-grooves in the flanges, the outer points, 6, upon the friction-wheels not touching the base of the grooves in the flanges, the object of this being to allow the inclined frictional surface to wear away and to bear at all times evenly.

The internal surface of the flanges $c'$ may be grooved, as shown in Figs. 2 and 3, wherein the friction-wheels $h$ bear upon the inner surface of the flange, or the outer surface of the flanges $c'$ may be grooved and the friction-wheels $h$ bear upon said outer surface, as shown in Fig. 4, the effectiveness and operation of the parts being practically the same in the one instance as in the other.

The driving-wheels $c$ will have a certain amount of free or lateral movement in their bearings, and to prevent said movement injuring the grooved friction-wheels $h$ or the grooves of the flanges $c'$, I mount said friction-wheels $h$ loosely upon the ends of the shaft $f$ and provide keys 8, secured in the ends of the shaft $f$, which keys bear in grooves through the friction-wheels $h$, allowing the wheels $h$ a sliding movement on the ends of the shaft $f$, but preventing them revolving independent from the shaft $f$.

I claim as my invention—

1. The combination, with the frame $a$ and the pair of wheels $b$ and an electrically-rotated motor-shaft, of a pair of wheels, $c$, having grooved flanges $c'$, the grooved pulleys $h$, and mechanism, substantially as herein shown and described, for moving the driving-wheels $c$ to engage their flanges $c'$ and the pulleys $h$, substantially as set forth.

2. The combination, with the frame $a$, the pair of wheels $b$, and an electrically-rotated motor-shaft, of the pair of wheels $c$, the flanges $c'$ upon the same, said flanges having V-shaped grooves across their faces, with channeled bases to said grooves, the friction-wheels $h$, having V-shaped grooves, the shaft $f$ for said friction-wheels, the gears $e$ and $g$, and mechanism, substantially as specified, for moving the driving-wheels to engage the flanges and friction-wheels, substantially as set forth.

3. The combination, with the frame $a$, the pair of wheels $b$, and an electrically-rotated motor-shaft, of the driving-wheels $c$, having grooved flanges $c'$, the grooved friction-wheels $h$, the rocking frames $s\ s'$, pivoted at 4, the yokes $o\ o'$ and levers $n\ n'$, pivoted at 5, and the rods $m\ m'$, for operating the same, substantially as set forth.

Signed by me this 22d day of June, 1888.

FRANCIS J. WEIS.

Witnesses:
GEO. T. PINCKNEY,
HAROLD SERRELL.